(12) United States Patent
Glebov et al.

(10) Patent No.: US 7,522,783 B2
(45) Date of Patent: Apr. 21, 2009

(54) OPTICAL INTERCONNECT APPARATUSES AND ELECTRO-OPTIC MODULATORS FOR PROCESSING SYSTEMS

(75) Inventors: Alexei Glebov, San Mateo, CA (US); Michael G. Lee, San Jose, CA (US); Dashun Steve Zhou, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 11/447,525

(22) Filed: Jun. 5, 2006

(65) Prior Publication Data

US 2007/0280578 A1 Dec. 6, 2007

(51) Int. Cl.
  *G02F 1/35* (2006.01)
(52) U.S. Cl. .......................................................... 385/2
(58) Field of Classification Search ........................ 385/2
  See application file for complete search history.

(56) References Cited

U.S. PATENT DOCUMENTS

| | | | |
|---|---|---|---|
| 4,991,920 A | 2/1991 | Peczalski | |
| 5,835,646 A | 11/1998 | Yoshimura et al. | |
| 6,215,585 B1 * | 4/2001 | Yoshimura et al. | 359/344 |
| 6,343,171 B1 | 1/2002 | Yoshimura et al. | |
| 6,400,855 B1 | 6/2002 | Li et al. | |
| 6,504,966 B2 | 1/2003 | Kato et al. | |
| 6,603,915 B2 | 8/2003 | Glebov et al. | |
| 6,611,635 B1 | 8/2003 | Yoshimura et al. | |
| 6,690,845 B1 | 2/2004 | Yoshimura et al. | |
| 6,823,097 B2 | 11/2004 | Glebov et al. | |
| 6,828,606 B2 | 12/2004 | Glebov | |
| 2002/0097962 A1 * | 7/2002 | Yoshimura et al. | 385/50 |
| 2003/0035614 A1 | 2/2003 | Glebov et al. | |
| 2003/0035632 A1 | 2/2003 | Glebov et al. | |
| 2003/0206675 A1 | 11/2003 | Glebov et al. | |
| 2004/0028316 A1 | 2/2004 | Yokouchi | |
| 2004/0126056 A1 | 7/2004 | Aoki et al. | |
| 2004/0126079 A1 | 7/2004 | Aoki et al. | |
| 2005/0002634 A1 | 1/2005 | Glebov et al. | |
| 2005/0157983 A1 | 7/2005 | Aoki et al. | |
| 2005/0163412 A1 | 7/2005 | Glebov et al. | |

(Continued)

OTHER PUBLICATIONS

L. Dalton, et al., "Polymeric Electro-optic Modulators: From Chromophore Design to Integration with Semiconductor Very Large Scale Integration Electronics and Silica Fiber Optics," Ind. Eng. Chem. Res., Jan. 1999, pp. 8-33, vol. 38, No. 1, American Chemical Society, USA.

S. Garner, et al., "Three-Dimensional Integrated Optics Using Polymers," IEEE Journal of Quantum Electronics, Aug. 1999, pp. 1146-1155, vol. No. 8, IEEE, New York.

(Continued)

*Primary Examiner*—Uyen Chau N Le
*Assistant Examiner*—Hoang Tran
(74) *Attorney, Agent, or Firm*—Baker Botts L.L.P.

(57) ABSTRACT

Disclosed are optical modulators that provide high-speed modulation capability and compact size. In exemplary modulator embodiments, the branch waveguide cores are formed in different processing layers than the input waveguide core, and light is coupled from an input waveguide core to two branch waveguide cores along diagonal directions. The construction enables the input waveguide core to be made of low-loss material compared to the electro-optic material of the branch waveguide cores. Also disclosed are interconnect apparatuses that can be used in processing systems. Exemplary interconnect apparatuses provide various configurations of components that enable high-speed modulation and compact size. The exemplary interconnect apparatuses may use the exemplary optical modulators disclosed herein.

10 Claims, 5 Drawing Sheets

U.S. PATENT DOCUMENTS

2005/0196094 A1 9/2005 Glebov et al.
2006/0008199 A1 1/2006 Glebov et al.
2006/0082885 A1 4/2006 Glebov et al.
2006/0126989 A1 6/2006 Glebov
2006/0126995 A1 6/2006 Glebov et al.

OTHER PUBLICATIONS

Glebov, et al., "Two-dimensional microlens arrays in silica-on-silicon planar lightwave circuit technology," J. Microlith., Microfab., Microsyst. Oct. 2003, pp. 309-318., vol. 2, No. 4, Society of Photo-Optical Instrumentation Engineers.

* cited by examiner

OPTICAL INTERCONNECT APPARATUSES AND ELECTRO-OPTIC MODULATORS FOR PROCESSING SYSTEMS

FIELD OF THE INVENTION

The present invention relates to optical interconnect apparatuses for processing systems, such systems including computers, electronic systems boards, opto-electronic systems boards and the like.

BACKGROUND OF THE INVENTION

As computers and communication devices become ever faster and the demand for signal communication within processing systems increases, there is a corresponding need to increase the speed of interconnections between the components used in such systems. Conventional electronic circuits have difficulties in achieving data speeds between components greater than about 10-15 Gbps over any appreciable distance. While optical systems can achieve much higher speeds than electronic circuits, they are more expensive to fabricate, and this greater expense has been an obstacle to the use of optical interconnects.

SUMMARY OF THE INVENTION

Accordingly, there is a need for improved, lower-cost optical interconnect solutions capable of high-speed operation for processing systems and the like.

A first set of inventions of the present application provides a low-loss construction of a Mach-Zehnder Interferometer modulator and similar modulators by configuring an input waveguide core and two branch waveguide cores at different heights above a common substrate so that light is coupled from the input waveguide core to the branch waveguide cores along diagonal directions. The construction enables the input waveguide core to be formed at a different processing layer than the branch waveguide cores, thereby enabling the input waveguide core to be formed with low-loss optical material and the branch waveguides to be formed with an electro-optic material, which can have higher losses than the material of the input waveguide core. Further preferred embodiments may include electrodes disposed near the input waveguide core and the end portions of the branch waveguide cores to enable the degree of coupling to each branch to be adjusted electrically.

Another set of inventions of the present application relates to optical interconnect apparatuses for use in a processing system, where the processing system comprises a substrate, a first integrated circuit chip, a second integrated circuit chip, and a need to convey data from the first integrated circuit chip to the second integrated circuit chip. An exemplary optical interconnect apparatus in this set of inventions comprises a semiconductor laser disposed on the substrate and outputting an unmodulated light beam, a waveguide divider having an input optically coupled to said laser and a plurality of outputs, each output providing a respective unmodulated light beam, and a plurality of optical modulators. Each optical modulator has an optical input optically coupled to a respective output of the waveguide divider, an optical output, and an electrical input to receive a data transmission signal. Each modulator is configured to generate a modulated light beam at its optical output from an unmodulated light beam coupled to its optical input, the modulator generating the modulated light beam in relation to the transmission signal at the modulator's electrical input. There are also a plurality of interconnect waveguides, with each interconnect waveguide having an input optically coupled to an output of a respective optical modulator and an output that goes to an optical receiver disposed near the second integrated circuit chip. The exemplary optical interconnect apparatus further comprises electrical drive circuitry to generate data transmission signals for the modulators from electrical signals provided to it from the first integrated circuit of the processing system. The electrical drive circuitry may be embodied on a driver IC chip that is disposed over the modulators, or may be implemented on the system's substrate, such as in an area underneath the modulators. The positioning of the electrical drive circuitry in these manners provides for a compact size for the interconnect apparatuses.

It is an object of one or more inventions of the present application to reduce the size of optical interconnect apparatuses that may be used in data processing systems.

It is yet another object of one or more inventions of the present application to increase the modulation speed for data transmissions over optical interconnect apparatuses that may be used in data processing systems.

It is yet another object of one or more inventions of the present application to reduce optical losses in optical modulators, particularly Mach-Zehnder Interferometers.

These and other objects of the present invention will become apparent to those skilled in the art from the following detailed description of the invention, the accompanying drawings, and the appended claims.

DETAILED DESCRIPTION OF THE INVENTION

In the following description, numerous specific details are set forth to provide a more thorough description of the specific embodiments of the inventions. It is apparent, however, that the inventions may be practiced without all the specific details given below. In other instances, well known features have not been described in detail so as not to obscure the invention.

Figure 1:
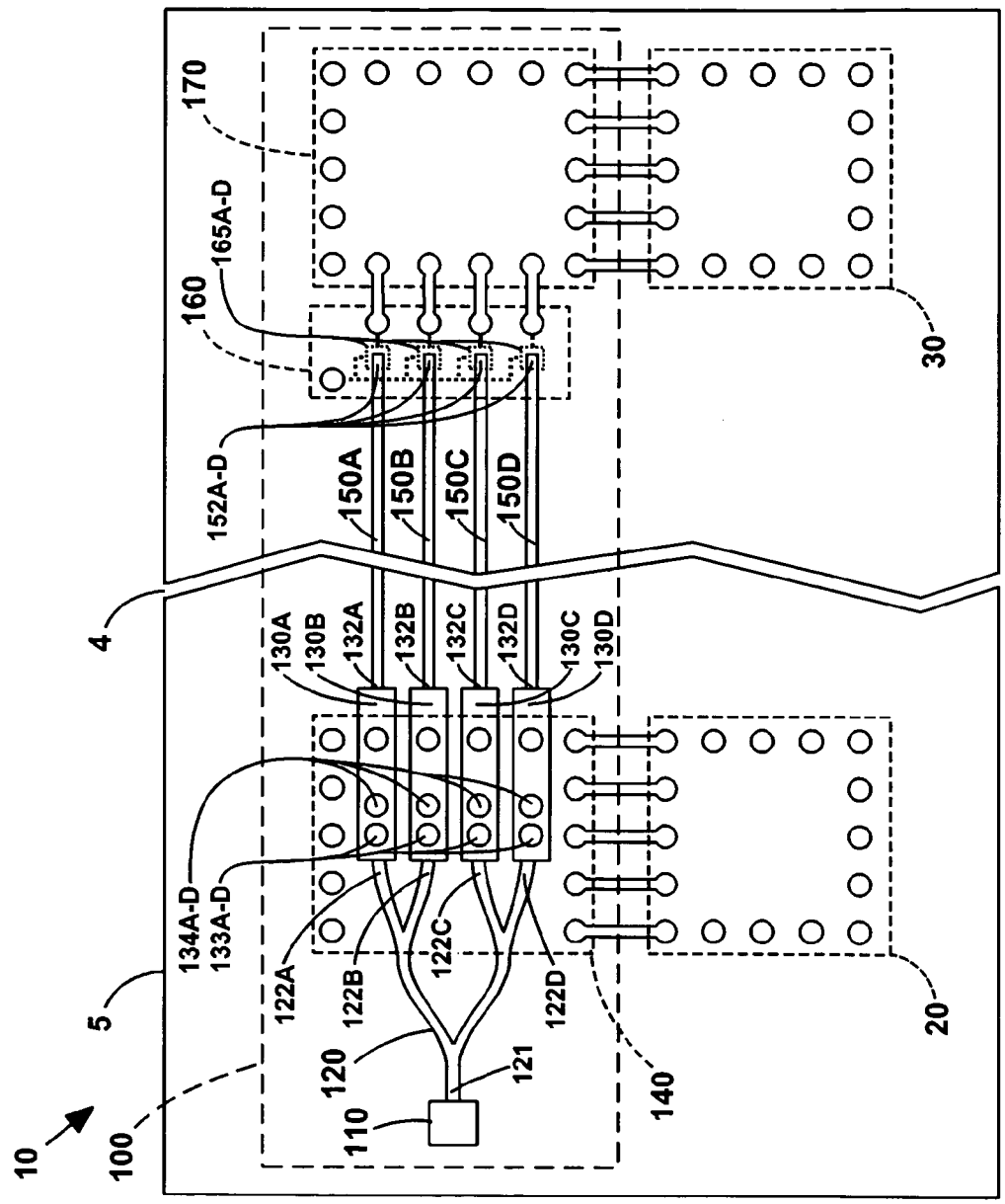
FIG. 1 shows a first exemplary embodiment of an optical interconnect apparatus according to an invention of the present application.

Exemplary Interconnect Apparatus 100. A first exemplary embodiment of an optical interconnect apparatus of the present application is shown at 100 in FIG. 1, as illustrated in the context of a processing system 10. System 10 is built on a substrate 5 that houses a plurality of electronic integrated circuit chips whose signals are interconnected to provide a desired system functionality. For the purposes of illustration and without loss of generality, two of the electronic chips are shown at 20 and 30, which are disposed at opposite ends of substrate 5, on opposite sides of a graphical break line 4. In order to show the features of apparatus 100, chips 20 and 30 are shown in dashed outlines. The electronic chips may have their input and output signals interconnected by conventional electrical traces, and by optical interconnect apparatuses according to the present inventions. Substrate 5 may comprise PCB materials, FR4, silicon, glass, or other suitable materials.

Apparatus 100 comprises a semiconductor laser 110 disposed on substrate 5 that outputs an unmodulated light beam, and a waveguide splitter 120 having an optical input 121 optically coupled to laser 110 and a plurality of optical outputs 122A-122D, each output providing a respective unmodulated light beam. Waveguide splitter 120 takes the light output of laser 110 and splits it up into a plurality of branches, typically between 2 and 32, with four such branches being shown in the figure.

Apparatus 100 further comprises a plurality of optical modulators 130A-130D, which have respective optical inputs optically coupled to respective optical outputs 122A-122D of waveguide splitter 120, respective optical outputs 132A-132D, respective first electrical inputs 133A-133D and respective second electrical inputs 134A-134D to receive respective transmission signals. The transmission signals for modulators 130A-130D are generated by a driver chip 140, which is disposed over at least a portion of the modulators 130A-130D and at least a portion of waveguide splitter 120, with its active surface facing modulators 130A-130D (so-called "flip-chip" orientation). This construction provides a compact size for apparatus 100. In order to show the features of waveguide splitter 120 and modulators 130A-130D, driver chip 140 is shown with dashed lines. Electrical connections between driver chip 140 and modulators 130A-130D are typically provided by solder bumps. Each modulator 130A-130D is configured to generate a modulated light beam at its optical output 132A-132D from an unmodulated light beam coupled to its optical input, with each modulator being configured to generate the modulated light beam in relation to the transmission signal presented at the modulator's electrical inputs. The electrical transmission signal for a modulator is typically provided in differential form, with the voltages on the first and second electrical inputs moving in opposite directions (i.e., one is increasing while the other is decreasing). However, single-ended electrical transmission signals may be used, in which case the second electrical inputs to modulators 130A-130D can be omitted. The data being conveyed by a particular modulator may be coded by any known signal coding method, with the voltages on the electrical inputs being driven by driver chip 140 to provide the desired signal coding. Driver chip 140 receives the content of the data to be transmitted by a modulator from integrated circuit chip 20, and can implement the coding method. As another approach, driver chip 140 can receive the data in coded form from chip 20 and simply provide drive signals to the modulators in relation to the electrical signals received from chip 20. In either case, the content of the data being transmitted by a modulator is generated by chip 20, not by driver chip 140.

Apparatus 100 further comprises a plurality of interconnect waveguides 150A-150D, each interconnect waveguide having an input optically coupled to an optical output 132A-132D of a respective optical modulator 130A-130D, and an optical output 152A-152D. Interconnect waveguides 150A-150D convey the optical output signals of modulators 130A-130D to various locations on board 5 where they are needed for processing system 10. To simplify the visual presentation of the figure and without loss of generality, the optical outputs 152A-152D are shown as terminating in a bank of photo-detectors 165A-165D that are fabricated on a detector chip 160. Each photo-detector 165A-165D generates an electrical signal in relation to the light signal provided to it at waveguide 152A-152D, respectively, and the electrical signals of the detectors are provided to amplification circuitry on an amplifier chip 170. The amplified electrical signals are provided to chip 30, which then decodes the amplified electrical signals and uses the content of the data in its operation. As an option, amplifier chip 170 may decode the amplified electrical signal to provide the underlying data content to chip 30. In typical systems, waveguides 150A-150D may be routed to other banks of photo-detectors, and may convey signals that are used by different chips rather than the same chip 30. Photo-detectors 165A-165D may comprise any known device that generates electrical energy from optical energy, such as semiconductor diodes, phototransistors, and the like. These devices generally comprise two terminals, one terminal that receives a reference voltage (such as ground potential) and another terminal that provides an electrical signal. Two terminal devices are shown in the figure, where the first terminals of the devices are electrically coupled to a common reference voltage, and the second terminals are provided to amplifier chip 170 by way of electrical traces formed on substrate 5 and by respective sets of solder bumps at the distal ends of the electrical traces. Amplifier chip 170 may include decoding circuitry to decode the signals provided on the interconnect lines if those signals have been encoded before transmission. In either event, amplifier chip 170 does not use the content of the data signals (i.e., it does not perform the functional processing of system 10).

Figure 2:
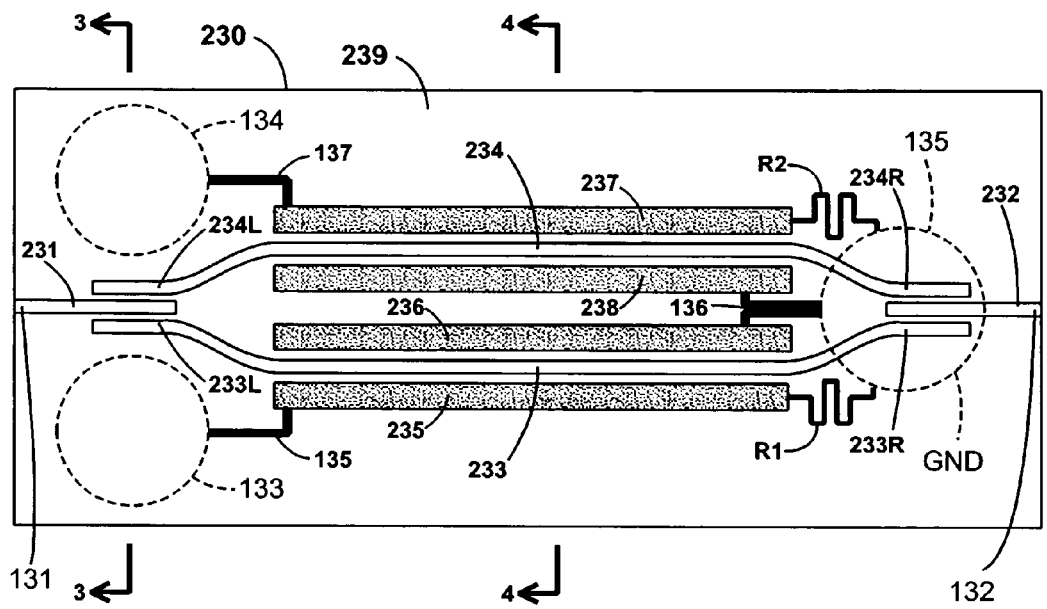
FIG. 2 is a top plan view of a first exemplary optical modulator according to an invention of the present application.

Exemplary Modulators. Modulators 130A-130D are preferably implemented by Mach-Zehnder Interferometers, which have high modulation speeds. A first exemplary Mach-Zehnder Interferometer modulator 230 according to an invention of the present application is shown in top plan view by FIG. 2. Modulator 230 may be formed on substrate 5, and may be used to implement any of modulators 130A-130D. Modulator 230 comprises an optical input 131 that can be coupled to any optical output 122A-122D of waveguide splitter 120, an optical output 132, a first electrical input 133, and a second electrical input 134. Modulator 230 generates a modulated output light beam (i.e., optical signal) at its output 132 from an unmodulated light beam coupled to its optical input, and generates the modulated output light beam in relation to a transmission signal presented at electrical inputs 133 and 134. Modulator 230 further comprises an input waveguide core 231 having a first end disposed at optical input 131 and a second end, an output waveguide core 232 having a first end disposed at optical output 132 and a second end, a first branch waveguide core 233, a second branch waveguide core 234, four electrodes 235-238, and three electrical traces 135-137. Each of waveguide cores 231-234 is surrounded by cladding material 239 having a lower index of refraction, with each core and surrounding cladding material forming a corresponding waveguide structure. Input waveguide core 231 is formed at a first height above the substrate and comprises a low-loss optical material. Each of branch waveguide cores 233 and 234 is formed at a second height above the substrate and comprises an electro-optic (EO) material. With the use of different heights, the input waveguide core 231 and the branch waveguide cores 233 and 234 can be formed as different layers by different groups of processing steps, with the ability to add a planarization step between the two groups of processing steps, if desired. In addition, input waveguide core 231 may be formed at the same time that waveguide splitter 120 and interconnect waveguides 150A-150D are formed. The conventional Mach-Zehnder construction forms the input waveguide core and branch waveguide cores from a single layer of electro-optic material, and teaches against the construction of modulator inventions of the present application.

First branch waveguide core 233 has a first end portion 233L and a second end portion 233R. First end portion 233L is disposed in close proximity to input waveguide core 231 such that a portion of a light beam propagating in waveguide core 231 can be optically coupled across a portion of cladding material 239 to first end portion 233L for propagation in first branch waveguide core 233 toward output waveguide core 232. Second end portion 233R is disposed in close proximity to output waveguide core 232 such that all or a portion of a light beam propagating in first branch waveguide core 233 can be optically coupled across a portion of cladding material 239 to output waveguide core 232. In a similar manner, second branch waveguide core 234 has a first end portion 234L and a second end portion 234R. First end portion 234L is disposed in close proximity to input waveguide core 231 such that a portion of a light beam propagating in waveguide core 231 can be optically coupled across a portion of cladding material 239 to first end portion 234L for propagation in second branch waveguide core 234 toward output waveguide core 232. Second end portion 234R is disposed in close proximity to output waveguide core 232 such that all or a portion of a light beam propagating in second branch waveguide core 234 can be optically coupled across a portion of cladding material 239 to output waveguide core 232.

In preferred embodiments of modulator 230, end portions 233L and 234L are disposed from (e.g., separated from) input waveguide 231 by substantially the same distance such that substantially the same amount of light is coupled to each of branch waveguide cores 233 and 234 from input waveguide core 231, and end portions 233R and 234R are disposed such that substantially all of the light from each of branch waveguide cores 233 and 234 is coupled to output waveguide core 232. The core material for branch waveguide cores 233 and 234 preferably comprises an electro-optic (EO) material whose refractive index can be changed by the application of an electrical field. In general, an increase in refractive index decreases the propagation speed of light in the branch waveguide. The electric field for first branch waveguide core 233 may be provided by a voltage difference applied between electrodes 235 and 236, and the electric field for second branch waveguide core 234 may be provided by a voltage difference applied between electrodes 237 and 238. In general, there will be a phase difference between the two light beams that couple into waveguide 213 from end portions 233R and 234R. The phase difference will depend upon the difference in lengths of branch waveguides 233 and 234, if any, and on the propagation speeds of light therein. With a zero degree phase difference, the light beams constructively add to produce an output light beam having an intensity greater than the intensity of either light beam (and slightly less than the sum of the two due to coupling losses). With a 180-degree phase difference, the light beams substantially cancel one another to produce an output light beam having an intensity less than the intensity of either light beam, and having an intensity of substantially zero. The intensity of the combined output light will vary between these two extremes when the phase difference varies between 0 degrees and 180 degrees, and between 180 degrees and 360 degrees.

By varying the potentials to electrodes 235-238, a difference in the propagation speeds in the branch waveguide cores 233 and 234 can be generated to produce a corresponding phase difference, and thus the intensity of the output light can be varied in relation to the voltages applied to the electrodes. In typical embodiments, a ground potential is applied to electrodes 236 and 238 by way of electrical trace 136 and electrical input 135, a first electrical modulation signal is applied to electrode 235 by way of electrical trace 135 and electrical input 133, and a second electrical modulation signal is applied to electrode 237 by way of electrical trace 137 and electrical input 134. The first and second electrical modulation signals are typically in differential form, meaning that one of them is increasing in value while the other is decreasing. Data information can be encoded on the electrical modulation signals by any modulation method. In some modulation methods, the output signal is switched between substantially zero optical intensity and full optical intensity. For embodiments using these methods, DC bias voltages can be applied to either or both of the electrodes to set modulator 230 to either have zero output intensity or full intensity when the electrical modulation signals are in a given state (e.g., a quiescent state). For this, prior to commencing operation of system 10, the optical output of modulator 230 can be measured for various DC bias voltages and the bias voltage that provides the desired intensity state may be selected for use during the operation of system 10.

The voltages applied to electrodes 235 and 237 are generally equal to or less than ~30 volts, and preferably equal to or less than ~5 volts. In some cases, the voltages may be equal to or less than ~1 volt. The length of modulator 230 typically ranges between 5 mm and 20 mm. The length of the modulator may be reduced if the magnitude of the voltages applied to electrodes 235 and 237 is increased; correspondingly, the magnitude of the voltages applied to electrodes 235 and 237 may be decreased if the length of the modulator is increased. That is to say, for a given range of phase differences in the optical output, there is an inverse relationship between the magnitude of the applied voltages and the length of the modulator. For high speed applications, each set of electrodes 235-236 and 237-238 is preferably configured as a controlled-impedance transmission line having a given characteristic impedance Zo. The electrical signals are provided to electrodes 235 and 237 at the distal ends nearest to the input waveguide core 231 (left ends in FIG. 2), and termination resistors R1 and R2 are coupled to the distal ends nearest the output waveguide core 232 (right ends in the figure). The resistance of each of resistors R1 and R2 is preferably substantially equal to the characteristic impedance Zo.

Figure 3:
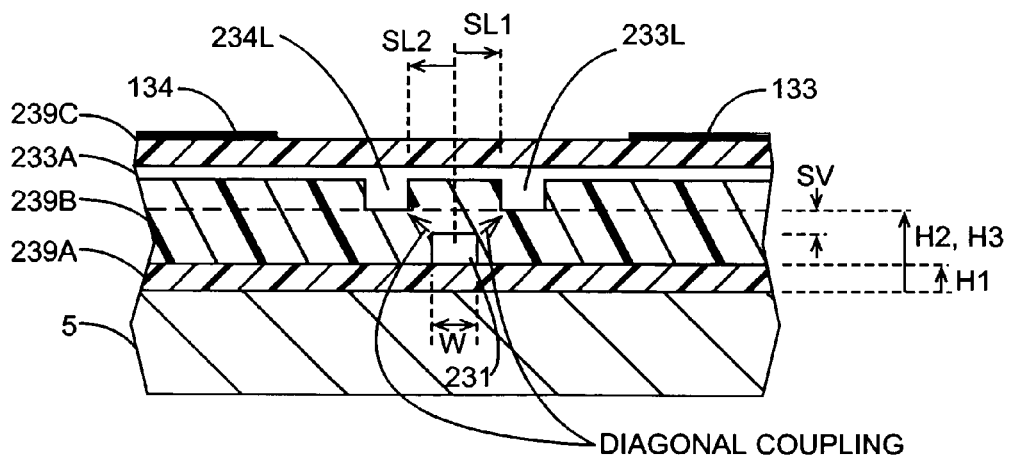
FIG. 3 is a first cross-sectional view of the exemplary modulator shown in FIG. 2 according to an invention of the present application.

FIG. 3 shows a cross-sectional view of modulator 230 taken at cross-section plane 3-3 that cuts transverse to input waveguide core 231 and end portions 233L and 234L of the branch waveguide cores. Input waveguide core 231 is formed upon a first cladding layer 239A, and is covered by a second cladding layer 239B. As novel features, branch waveguide cores 233 and 234 are formed above input waveguide core 231 and to respective sides thereof, and are embedded in second cladding layer 239B. (Second cladding layer 239B can be formed as two sub-layers on top of one another, as indicated by the dashed line in the layer.) In this construction, the light from input waveguide core 231 is coupled to branch waveguide cores 233 and 234 along directions that are inclined to the plane of substrate 5, and on diagonals in the cross-section shown in the figure. A third cladding layer 239B is formed over branch waveguide cores 233 and 234, and electrodes 133-134 and 235-238 are formed over third cladding layer 239B. Branch waveguide cores 233 and 234 may be formed by first forming grooves in cladding layer 239B for them, and then coating a single layer of electro-optic material over cladding layer 239B, which leaves a thin top layer 233A over second cladding layer 239B. The EO material is then poled in a conventional way. Layer 233A does not interfere with the ability of cladding layers 239B and 239C to optically confine the light propagating in branch waveguide cores 233 and 234 once light has been coupled from input waveguide core 231. Layer 233A can be omitted. The layer and core components of the modulator may be formed by coating layers of suitable optical or electro-optic material over the substrate, and patterning the layers (such as with photo-lithography and etching steps).

With this construction, it may be seen in the figure that input waveguide core 231 has a bottom surface disposed over a substrate at a first height H1, a top surface above the bottom surface, a left side wall extending from the bottom surface to the top surface, a right side wall extending from the bottom surface to the top surface and disposed opposite to the left side wall, and a width W between the right and left side walls. First branch waveguide core 233 has a bottom surface disposed over the substrate at a second height H2, a top surface above the bottom surface, a left side wall extending from the bottom surface to the top surface, a right side wall extending from the bottom surface to the top surface and disposed opposite to the left side wall, a first distal end at end portion 233L and a distal second end at end portion 233R (shown in FIG. 2). The second height H2 is greater than the first height H1. The first distal end is disposed adjacent to input waveguide core 231, and the second distal end is disposed adjacent to output waveguide core 232 (shown in FIG. 2). Similarly, second branch waveguide core 234 has a bottom surface disposed over the substrate at the second height H2, a top surface above the bottom surface, a left side wall extending from the bottom surface to the top surface, a right side wall extending from the bottom surface to the top surface and disposed opposite to the left side wall, a first distal end at end portion 234L and a second distal end at end portion 234R (shown in FIG. 2). The first distal end is disposed adjacent to input waveguide core 231, and the second distal end is disposed adjacent to output waveguide core 232 (shown in FIG. 2).

Preferably, there is a non-negative vertical separation distance SV of a few microns between the top surface of input waveguide core 231 and the bottom surface of each of the end portions 233L and 234L of the branch waveguide cores, but the vertical separation distance SV can be zero. In addition, there is preferably a first lateral separation distance SL1 between the right side wall of the first end portion 233L of the first branch waveguide core 233 and the center of the width W of the input waveguide core 231, and a second lateral separation distance SL2 between the right side wall of the first end portion 234L of the first branch waveguide core 234 and the center of the width W of the input waveguide core 231. Lateral spacing distances SL1 and SL2 are preferably the same, but may be different (to provide different degrees of coupling). Lateral spacing distance SL1 can have a value sufficiently large to provide a non-negative lateral separation distance between the right side wall of input waveguide core 231 and the left side wall of end portion 233L of branch waveguide core 233. Similarly, lateral spacing distance SL2 can have a value sufficiently large to provide a non-negative lateral separation distance between the left side wall of input waveguide core 231 and the right side wall of end portion 234L of branch waveguide core 234. Typical values of width W are 1 μm-5 μm, typical values of SL1 and SL2 are 1 μm-5 μm, and typical values in the height difference (H2-H1) are 1 μm-5 μm.

Figure 4:
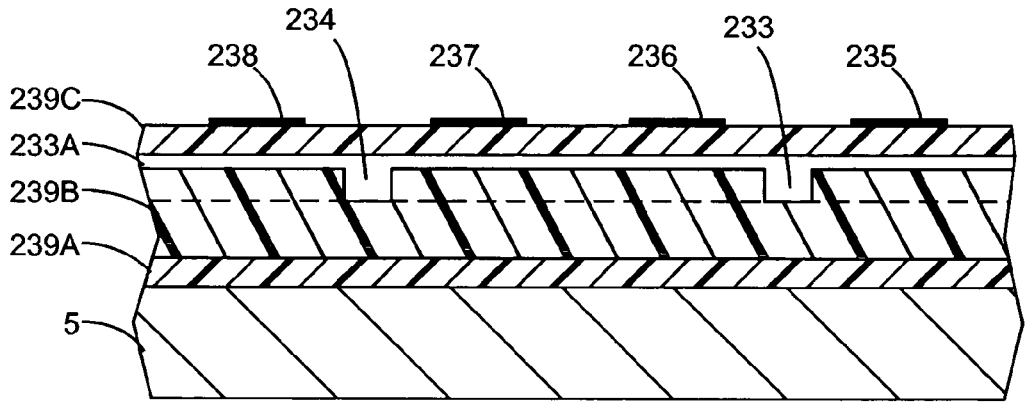
FIG. 4 is a second cross-sectional view of the exemplary modulator shown in FIG. 2 according to an invention of the present application.

FIG. 4 shows a cross-sectional view of modulator 230 taken at a cross-section plane 4-4 that cuts transverse to branch waveguide cores 233 and 234 and electrodes 235-238. Branch waveguide cores 233 and 234 are sufficiently far away from one another that there is no optical coupling between them. A potential difference between electrodes 236 and 237 generates an electric field that passes through branch waveguide core 233 in directions that are generally parallel to the surfaces of substrate 5, the cladding layers 239A-239C, EO layer 233A, and branch waveguide core 233. This field changes the index of refraction of branch waveguide core 233 and EO layer 233A in relation to the potential difference between electrodes 235-236, thereby changing the propagation speed of light in branch waveguide 233. As an advantageous effect, thin EO layer 233A reduces the amount of potential difference needed to achieve a desired change in the propagation speed of light in comparison to the case when it is not present, and does so without preventing the cladding layers from confining light in the lateral dimensions. In a similar manner, a potential difference between electrodes 238 and 239 generates an electric field that passes through branch waveguide core 234 in directions that are generally parallel to the surfaces of substrate 5, the cladding layers 239A-239C, EO layer 233A, and branch waveguide core 234. This field changes the index of refraction of branch waveguide core 234 and EO layer 233A in relation to the potential difference between electrodes 237-238, thereby changing the propagation speed of light in branch waveguide 234.

Figure 5:
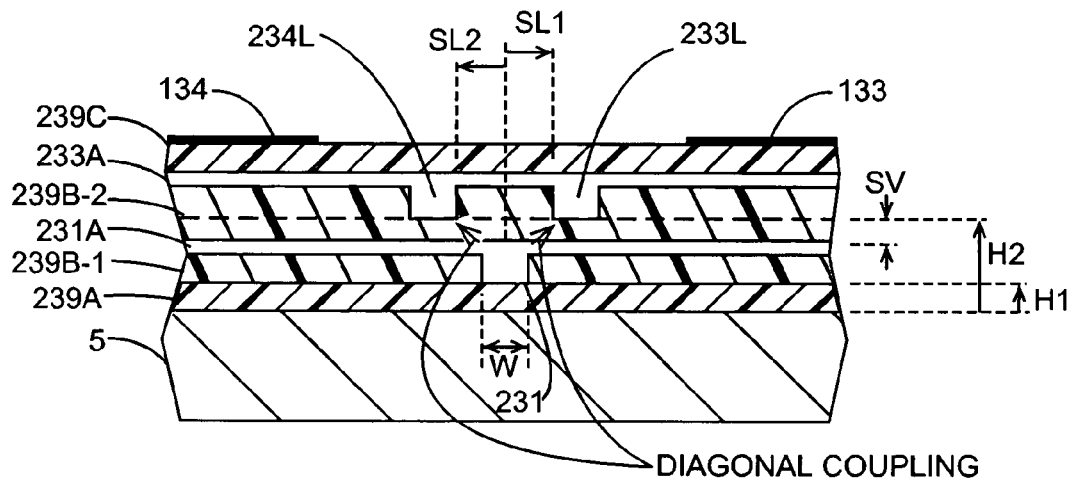
FIG. 5 is a cross-sectional view of a further exemplary modulator having input and output waveguide cores with ridge structures according to an invention of the present application.
Figure 7:
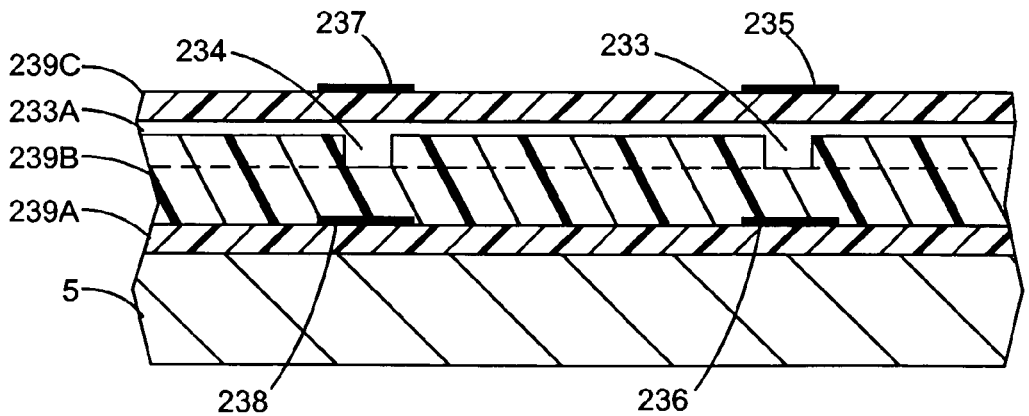
FIG. 7 is a cross-sectional view of a further exemplary modulator having vertically disposed electrodes according to an invention of the present application.

As indicated above, branch waveguide cores 233 and 234 were formed such that a thin layer 233A is disposed above them, which provides a ridge waveguide structure. The input waveguide core 231 may also be formed with a ridge waveguide structure. This further embodiment of modulator 230 is illustrated in FIG. 5, which is a cross-sectional view taken along the same cross-sectional lines as FIG. 3. Cladding layer 239B is divided into two sub-layers 239B-1 and 239B-2, with a thin layer 231A of optical material disposed between them and above input waveguide core 231. In this embodiment, input waveguide core 231 (and output waveguide core 232 as well) may be formed by forming a corresponding groove in cladding sub-layer 239B-1, and then coating a single layer of optical material over cladding layer 239B-1, which leaves a thin top layer 231A over cladding sub-layer 239B-1. Cladding sub-layer 239B-2 is thereafter formed, followed by the formation of branch waveguide cores 233 and 234, as described above. Layer 231A does not interfere with the ability of cladding sub-layers 239B-1 and 239B-2 to optically confine the light propagating in branch waveguide cores 233 and 234 once light has been coupled from input waveguide core 231, and does not interfere with the ability of cladding layer 239A and cladding sub-layer 239B-1 to optically confine the light propagating in input waveguide core 231 before the coupling section with branch waveguide cores 233 and 234 (or with the propagation of light in output waveguide core 232 once light has been coupled to it). The ridge structure formed by input waveguide core 231 and layer 231A increases coupling efficiency to branch end portions 233L and 234L, particularly when branch waveguide cores 233 and 234 comprise ridge waveguide structures (e.g., when layer 233A is present).

Figure 6:
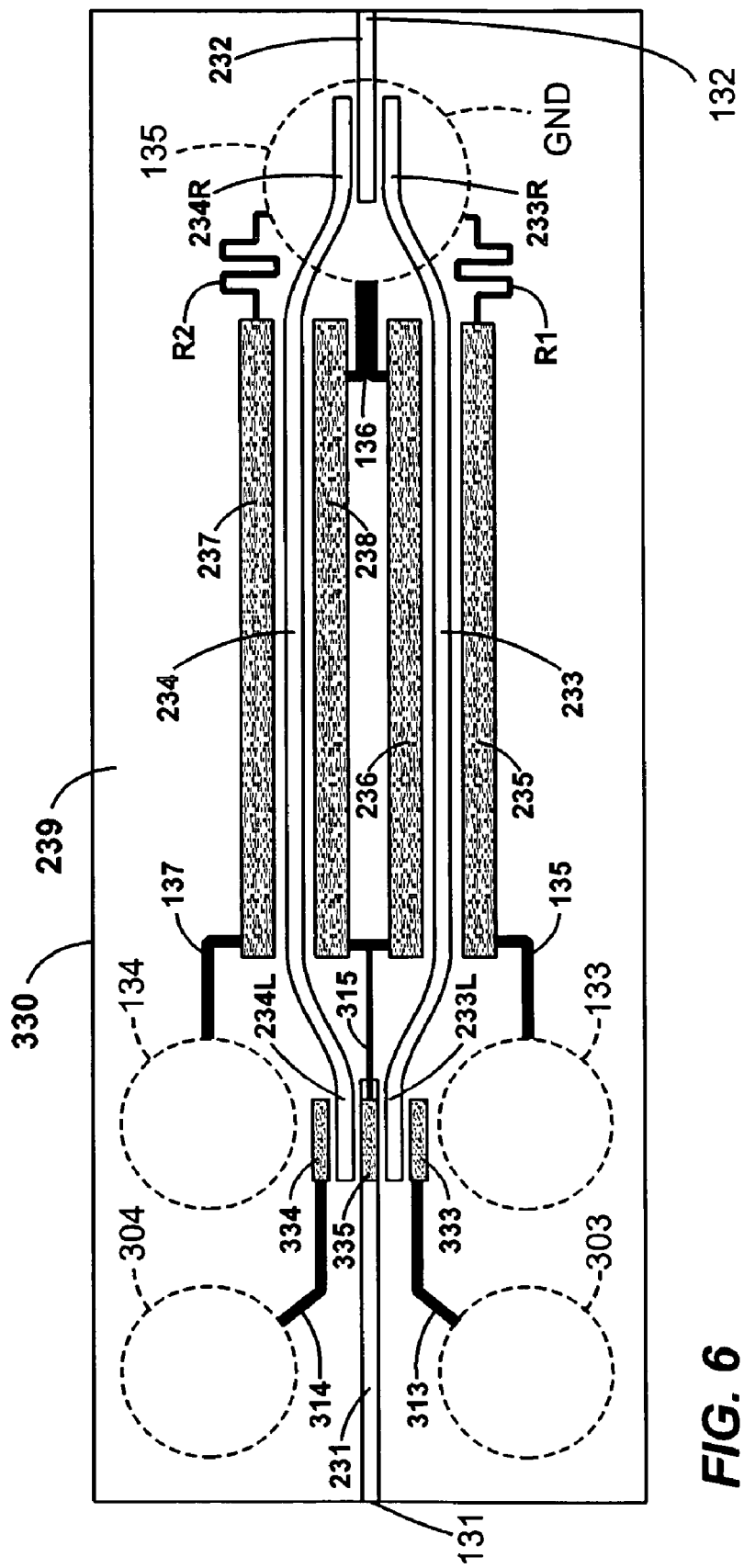
FIG. 6 is a top plan view of a second exemplary optical modulator according to an invention of the present application.

FIG. 6 shows a top plan view of a second exemplary Mach-Zehnder Interferometer modulator 330 according to an invention of the present application. Modulator 330 comprises the same components as modulator 230, which are designated by the same reference numbers, with the components being configured in the same way. Branch waveguide cores 233 and 234 are typically formed by different processing steps that use different masks, and thus there is a possibility of misalignment of the branch waveguide cores 233 and 234 to input waveguide core 231, which would cause unequal amounts of light to be coupled to the branch waveguide cores. Modulator 330 has the capability of electrically adjusting the amounts of light coupled from input waveguide core 231 to the branch waveguide cores 233 and 234 to compensate for any such misalignment. This enables the ratio of light division to be set electrically by system 10 prior to operation so that substantially equal amounts of light are coupled to the branches. For this, modulator 330 comprises three electrodes 333-335 disposed in close proximity to the first end portions 233L and 234L of the branches, three electrical traces 313-315 that convey electrical potentials to electrodes 333-335, and two electrical input pads 303 and 304 to receive bias potentials. Electrode 335 is disposed over the end portion of input waveguide core 231 that is closest to end portions 233L and 234L of the branches, and is fed with ground potential by trace 315 (by way of electrodes 236 and 238). Electrode 333 is disposed on the side of branch end portion 233L that is opposite to electrode 335, such that end portion 233L is located between electrodes 333 and 335. Electrode 333 is electrically coupled to input pad 303 by trace 313. Input pad 303 is adapted to receive a first bias potential and convey it to electrode 333, where a resulting electric field can be established between electrodes 333 and 335. The electric field changes the refractive index of branch end portion 233L, and this changes the amount of light coupling between input waveguide core 231 and branch end portion 233L. In general, the amount of light coupling increases as the refractive index increases, and vice versa. In a similar manner, electrode 334 is disposed on the side of branch end portion 234L that is opposite to electrode 335, such that end portion 234L is located between electrodes 334 and 335. It is electrically coupled to input pad 304 by trace 314. Input pad 304 is adapted to receive a second bias potential and convey it to electrode 334, and a resulting electric field can be established between electrodes 334 and 335. The electric field changes the refractive index of branch end portion 233L, and this changes the amount of light coupling between input waveguide core 231 and branch end portion 234L. In general, the best optical coupling occurs when input waveguide core 231 and each of branch end portions 233L and 234L have substantially the same refractive index. As the refractive index of the branch end portion increases or decreases from that of the input waveguide core, the coupling coefficient decreases in a generally parabolic manner. In addition to applying potentials on electrodes 333-334 to equalize the coupling of light to branch end portions 233L and 234L, additional bias potentials may be applied to electrodes 333-334 to move the refractive indices of branch end portions 233L and 234L toward that of input waveguide core 231 in order to maximize optical coupling. Even though the modulator total insertion loss is an important device parameter it is not the most crucial in the device performance evaluation. Unequal distribution of the light in the MZI branches does not allow full cancellation of the light at the output of the MZI and therefore reduces dramatically the extinction ratio of the modulator. The reduced extinction ratio can be more harmful to the communication system than the total insertion loss. Thus, balancing of the MZI branches can have a somewhat higher priority over the small additional losses which can accumulate due to the balancing procedure.

Typically, only one bias potential is applied to input pads 303-304. In the case where input waveguide core 231 and branch end portions 233L and 234L have substantially the same refractive index, the bias potential is typically applied to the branch which has the stronger coupling. The bias potential, regardless of its sign (i.e., positive or negative), reduces the coupling of the stronger branch for the reasons explained in the prior paragraph. Prior to operation, system 10 can apply oscillating modulation signals to main electrodes 235 and 237 that generate an oscillating optical signal that can be sampled to determine the difference between high and low optical intensities, as well as the difference between even-numbered and odd-numbered peak intensities. The even-numbered peaks can be correlated to one branch, and the odd-numbered peaks to the other branch, and a difference in peak values between even-numbered and odd-numbered peaks can be used to determine the stronger branch. Then, a first bias potential can be applied to the input pad corresponding to the stronger branch in an increasing manner until the peak levels are equalized; the difference between high and low intensities should also increase. If the peak intensity values cannot be correlated to the branches, then the first bias potential may be applied to each of input pads 303 and 304 separately to see which application provides the greatest difference between high and low optical intensities.

In the case where input waveguide core 231 and branch end portions 233L and 234L have different refractive indices, the bias potential is typically applied to the branch that has the weaker coupling. If the weaker branch can be determined from an examination of the peak values of even and odd-numbered intensity peaks, then the first bias potential can be applied to the input pad corresponding to the identified branch. Specifically, the first bias potential can be applied to the input pad in an increasing manner (positive sign) to see if the difference between high and low intensities increases. If it does, the first bias potential is increased to the point where the difference begins to decrease. If, instead, the increasing application of the first bias potential decreases the difference, then the first bias potential is instead decreased (negative sign) in a decreasing manner to see if the difference increases. If it does, the bias potential is decreased to the point where the difference begins to decrease.

In addition, the following general method may be used in either of the above refractive-index cases. A first bias potential is applied to input pad 303 in an increasing manner to find a point where the difference between high and low optical intensities reaches a maximum. If it is found, the corresponding bias voltage is recorded; otherwise a fail flag is recorded. These actions are repeated, but with a decreasing voltage applied to input pad 303. These actions are again repeated for input pad 304, with both increasing and decreasing voltages. After all four tests have been conducted, the bias potential providing the largest difference between high and low optical intensities is identified, and can then be used during system operation.

After the above actions are performed to equalize the coupling to the two branches, a common mode bias potential may be applied to both of electrodes 303 and 304 to determine if the coupling to both branches can be increased.

While bias electrodes 333-335 are illustrated as being disposed on the top surface of the completed substrate, it may appreciated that one or more of the electrodes may be embedded within the cladding layers 239A-239C, and that each pair of electrodes (333, 335 and 334, 335) may be disposed along a vertical line or a diagonal line rather than a lateral line (as is shown in FIG. 4).

In the above examples, the branch waveguide cores 233 and 234 are illustrated as having heights above the substrate that are greater than is the height of the input waveguide core 231 above the substrate. It may be appreciated that the modulators may be implemented with the reverse configuration, namely that the input waveguide core 231 has a height above the substrate which is greater than are the heights of the branch waveguide cores 233 and 234 above the substrate. In this case, electrodes 235-238 may be embedded within the cladding layers 239A-239C. Also in the above examples, the electrodes 235-238 are illustrated as being disposed lateral to the branch waveguide cores 233 and 234. It may be appreciated that they may instead be stacked above and below the cores (i.e., disposed vertically), as is illustrated in the schematic cross-sectional view of FIG. 6.

Further Modulator Features. Further exemplary modulator embodiments may comprise one or more of the following additional features. As illustrated in the top plan view of FIG. 8, the end of input waveguide 231 may have a tapered width, where it has its standard width at the leftmost distal ends of branch waveguide cores 233 and 234, and narrows as it progresses to the right (in the direction of light propagation). Also, the end portions 233L and 234L of the branch waveguide cores may have tapered widths, such that the taper is the narrowest at the leftmost distal ends. As before, branch waveguide cores 233 and 234 and their respective end portions 233L and 234L are disposed at a different height above the substrate than the height of the input waveguide core 231 above the substrate.

Figure 8:
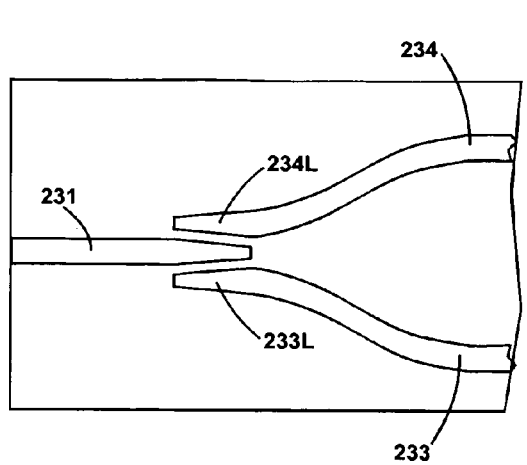
FIG. 8 is a partial top plan view of a further exemplary optical modulator having waveguide cores with tapered coupling areas according to an invention of the present application.
Figure 9:
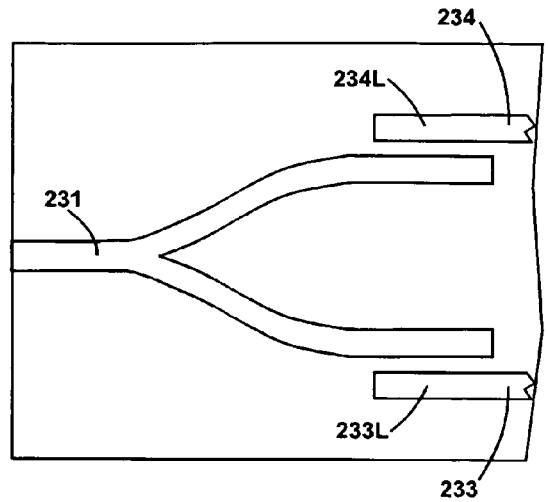
FIG. 9 is a partial top plan view of a further exemplary optical modulator having another coupling construction according to an invention of the present application.

In the above modulator examples, the branch end portions 233L and 234L are disposed on either side of the input waveguide core 231. It may be appreciated that the end portion of the input waveguide core may comprise a splitter that divides the light into two branches, and that each branch end portion 233L and 234L may be disposed adjacent to respective ones of these branches for coupling, as illustrated in the schematic top plan view of FIG. 9 (e.g., each end portion 233L and 234L is disposed closer to its respective input branch than the other input branch). As before, branch waveguide cores 233 and 234 and their respective end portions 233L and 234L are disposed at a different height above the substrate than the height of the input waveguide core 231 above the substrate. In addition, the end portions of the waveguide cores may be tapered, as illustrated in FIG. 8.

Figure 10:
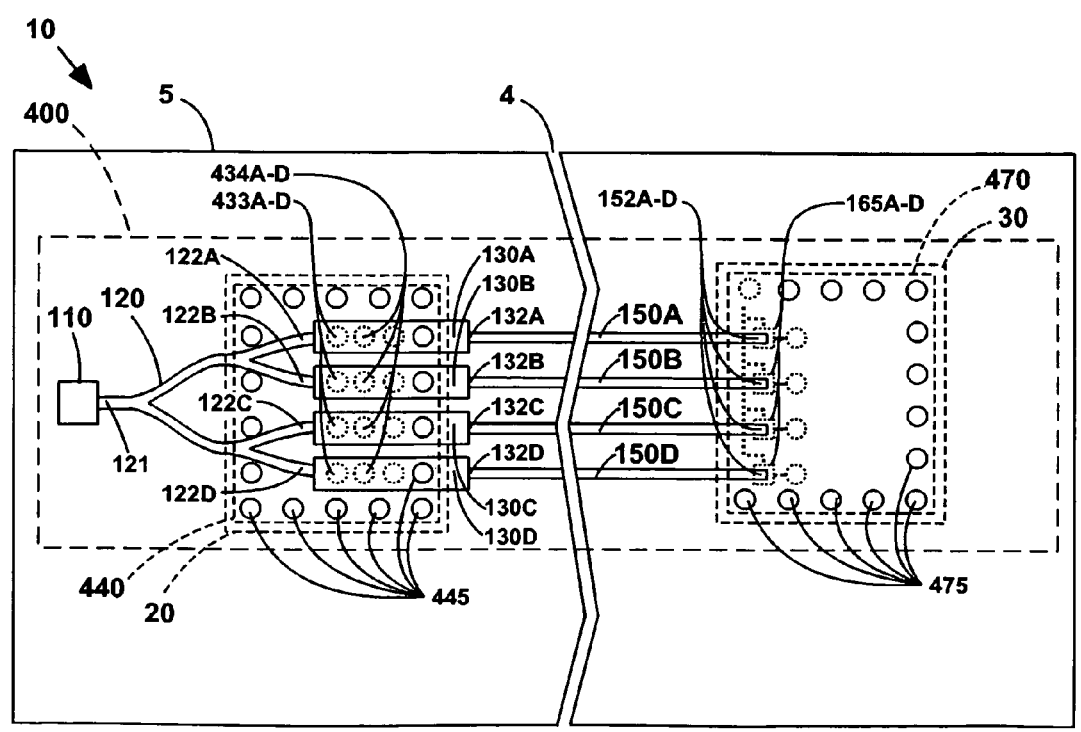
FIG. 10 is a third exemplary optical modulator according to an invention of the present application.

Exemplary Interconnect Apparatus 400. A second exemplary embodiment of an optical interconnect apparatus of the present application is shown at 400 in FIG. 10, as illustrated in the context of a processing system 10. As before, apparatus 400 provides data interconnection from chip 20 of system 10 to chip 30 of system 10. Except for components 140, 160 and 170, the components of apparatus 400 are the same as those in apparatus 100 and are configured in a like manner. Instead of having driver chip 140, apparatus 400 has driver circuitry 440 formed on the surface of substrate 5, generally at a level below the level of modulators 130A-130D, and preferably below the modulators. Drive circuitry 440 comprises the same functionality and drive circuitry as driver chip 140, except that it is formed on substrate 5 instead of on a separate chip. Yield and reliability of drive circuitry 440 can be increased through the inclusion of redundant circuits which may be selectively tested and electronically configured to replace portions of the main circuitry when those portions fail. Chip 20 can then be disposed over circuitry 440 (and modulators 130A-130D) and electrically coupled thereto by a series of solder bumps and pads, which are generally illustrated at 445. This significantly increases the space utilization of substrate 5, enabling more circuits to be incorporated onto it. Electrical connections between circuitry 440 and modulators 130A-130D can be made using electrical vias 434A-D and 433A-D.

As a further difference with respect to apparatus 100, apparatus 400 has its bank of photo-detectors 165A-165D formed on substrate 5 rather than on a separate detector chip 160. In the case that substrate 5 comprises silicon, a silicon-germanium layer may be formed on substrate 5 to provide suitable photo-detection material for the construction of detectors 165A-165D. As yet a further difference, apparatus 400 has amplification circuitry 470 formed on the surface of substrate 5 instead of on amplifier chip 170. Amplification circuitry 470 can be integrally formed with detectors 165A-165D in a single compact location outlined by the rectangular dashed box having reference number 470 in the figure. Amplifier circuitry 470 comprises the same functionality and drive circuitry as amplifier chip 140, except that it is formed on substrate 5 instead of on a separate chip. Yield and reliability of amplifier circuitry 470 can be increased through the inclusion of redundant circuits which may be selectively tested and electronically configured to replace portions of the main circuitry when those portions fail. Chip 30 can then be disposed over circuitry 470 (and detectors 165A-165D) and electrically coupled thereto by a series of solder bumps and pads, which are generally illustrated at 475. This significantly increases the space utilization of substrate 5, enabling more circuits to be incorporated onto it. Electrical connections between circuitry 470 and detectors 165A-165D can be made using electrical traces and vias.

While the present inventions have been particularly described with respect to the illustrated embodiments, it will be appreciated that various alterations, modifications and adaptations may be made based on the present disclosure, and are intended to be within the scope of the present inventions. While the inventions have been described in connection with what are presently considered to be the most practical and preferred embodiments, it is to be understood that the present inventions are not limited to the disclosed embodiments but, on the contrary, are intended to cover various modifications and equivalent arrangements included within the scope of the appended claims.

What is claimed is:

1. An optical modulator comprising:
an input waveguide core having a bottom surface disposed over a substrate at a first height, a top surface above the bottom surface, a left side wall extending from the bottom surface to the top surface, and a right side wall extending from the bottom surface to the to surface and disposed opposite to the left side wall;
a first branch waveguide core having a bottom surface disposed over the substrate at a second height, a top surface above the bottom surface, a left side wall extending from the bottom surface to the top surface, a right side wall extending from the bottom surface to the top surface and disposed opposite to the left side wall, a first end portion and a second end portion, the second height being greater than the first height, the first end portion being disposed adjacent to the input waveguide core;
a second branch waveguide core having a bottom surface disposed over the substrate substantially at the second height, a top surface above the bottom surface, a left side wall extending from the bottom surface to the top surface, a right side wall extending from the bottom surface to the top surface and disposed opposite to the left side wall, a first end portion and a second end portion, the first end portion being disposed adjacent to the input waveguide core;

the input waveguide core and the first and second branch waveguides configured such that there is a lateral separation between the right side wall of the input waveguide core and the left side wall of the first end portion of the first branch waveguide core, and a lateral separation between the left side wall of the input waveguide core and the right side wall of the first end portion of the second branch waveguide core;

cladding material disposed adjacent to at least one of the first and second branch waveguide cores; and a first signal-modulation electrode and a second signal-modulation electrode, each electrode being disposed adjacent to one of the first and second branch waveguide cores;

wherein at least one of the first and second branch waveguide cores comprises an electro-optic material having a refractive index that varies with an applied electric field; and wherein each of the input waveguide core, first branch waveguide core, and second branch waveguide core has a refractive index that is greater than the refractive index of the cladding layer.

2. The optical modulator of claim 1 further comprising a vertical separation distance between the top surface of input waveguide core and the bottom surface of the first end portion of the first branch waveguide core.

3. The optical modulator of claim 1 further comprising a layer of core material disposed between the input waveguide core and the branch waveguide cores, the layer of core material having a refractive index that is greater than the refractive index of the cladding material.

4. The optical modulator of claim 3 wherein the layer of core material abuts the input waveguide core.

5. The optical modulator of claim 3 further comprising a layer of electro-optic material that abuts against a surface of the first branch waveguide core and a surface of the second branch waveguide core.

6. The optical modulator of claim 1 further comprising a first bias electrode and a second bias electrode, the first and second bias electrodes being disposed adjacent to the first end portion of the first waveguide core.

7. The optical modulator of claim 6 further comprising a third bias electrode, the third and second bias electrodes being disposed adjacent to the first end portion of the second waveguide core.

8. The optical modulator of claim 1 wherein at least one of the input waveguide core and the first end portions of the first and second branch waveguide cores comprises a tapered width between its left and right side walls.

9. The optical modulator of claim 1 wherein the input waveguide core has a tapered width that narrows in the direction of light propagation from the input waveguide core toward the first portion of the first branch waveguide core, and wherein the first portion of the first branch waveguide core has a tapered width that expands in the direction of light propagation from the input waveguide core toward the first portion of the first branch waveguide core.

10. The optical modulator of claim 1 wherein the first waveguide core comprises a splitter with two branches, wherein the first end portion of the first branch waveguide core is disposed adjacent to one of the input branches, and the first end portion of the second branch waveguide core is disposed adjacent to the other of the input branches.

* * * * *